April 5, 1960     O. W. BOUGHTON ET AL     2,931,116
SLIDE PROJECTOR TRAY
Filed March 18, 1958                          2 Sheets-Sheet 1
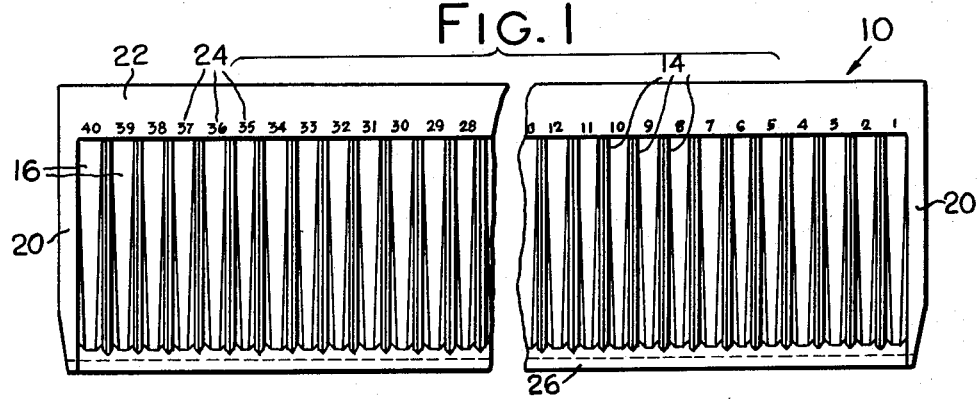
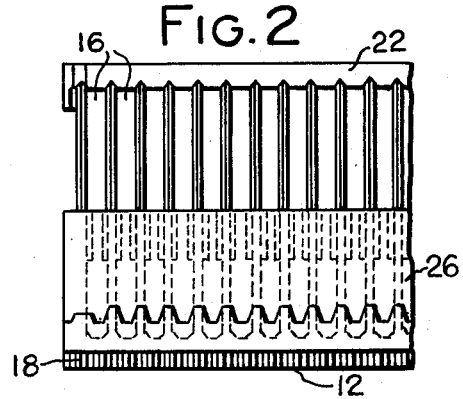 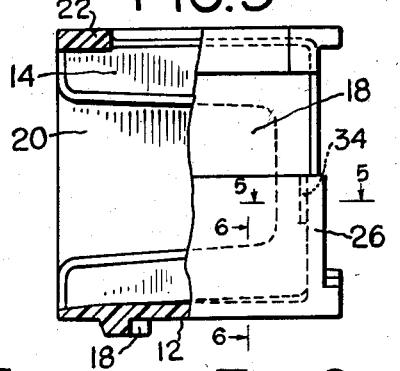
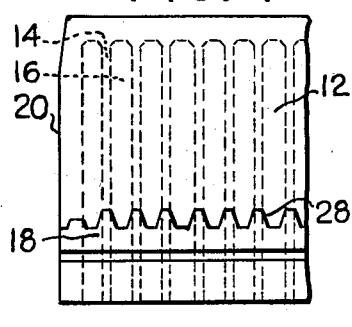 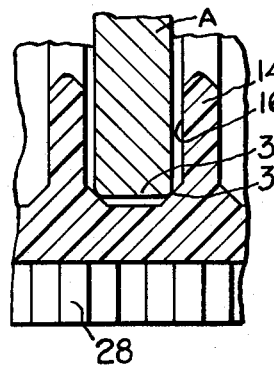 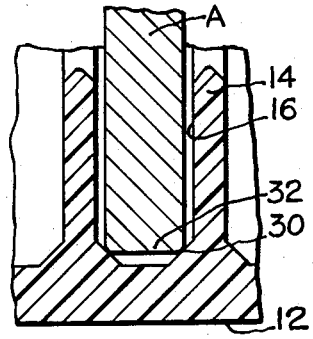
OLIN W. BOUGHTON
CHARLES J. DeGRAVE Jr.
KENNETH D. MAIER
INVENTORS
BY *[signatures]*
ATTORNEYS April 5, 1960  O. W. BOUGHTON ET AL  2,931,116
SLIDE PROJECTOR TRAY Filed March 18, 1958  2 Sheets-Sheet 2

OLIN W. BOUGHTON
CHARLES J. DeGRAVE JR.
KENNETH D. MAIER
INVENTORS

BY
ATTORNEYS

United States Patent Office
2,931,116
Patented Apr. 5, 1960

2,931,116

SLIDE PROJECTOR TRAY

Olin W. Boughton, Canandaigua, Charles J. De Grave, Jr., Chili, and Kenneth D. Maier, Mendon, N.Y., assignors to Bausch & Lomb Optical Company, Rochester, N.Y., a corporation of New York Application March 18, 1958, Serial No. 722,296

5 Claims. (Cl. 40—79)

This invention relates to slide trays and more particularly to trays for slide projectors of the type which provide means for intermittently advancing the tray in order to successively move film slides into and out of projection position.

The present invention is particularly adapted for use in a slide projector of the type disclosed and claimed in our copending application Serial No. 640,710, filed on February 18, 1957. The instant application includes the slide tray disclosure and claims, which were divided out of said co-pending application, and, in addition, new matter which relates to resilient holding means for the film slides.

An object of this invention is to provide in a slide tray of the type described improved releasable holding means for retaining the slides in the tray whereby the movement of the slides into and out of the tray will be under positive control so that jamming of the operation is prevented.

Another object of the invention is to provide an improved slide tray which is adapted to permit the movement of a film slide engaging finger therein both from one side of the tray and across the top thereof thereby minimizing the length of the finger in the direction of its travel.

Other objects and advantages will become apparent from the following description taken in conjunction with the accompanying drawing, wherein:

Fig. 1 is a plan view of the slide tray of the present invention;

Fig. 2 is an elevation of one end portion of the slide tray;

Fig. 3 is an end view of the tray with parts broken away;

Fig. 4 is a bottom view of the portion of the slide tray shown in Fig. 12;

Figure 7:
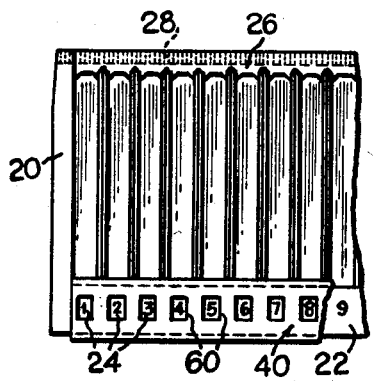
Figure 8:
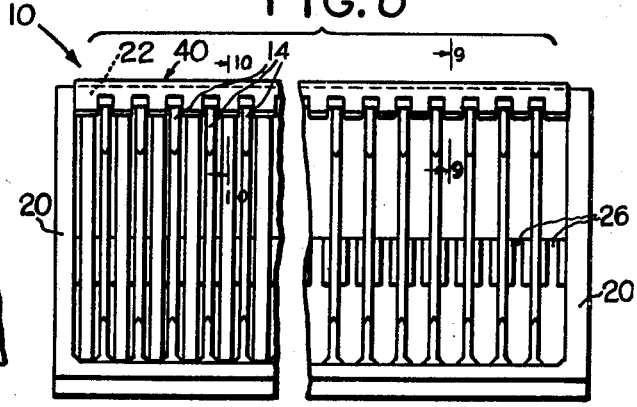
Figure 10:
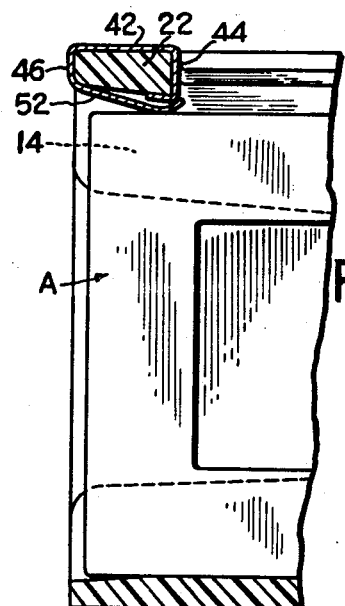
Figure 9:
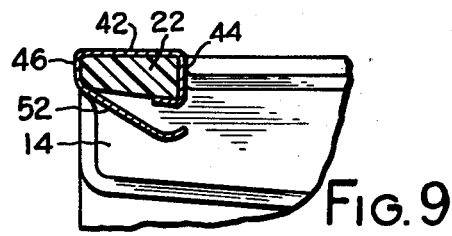
Figure 11:
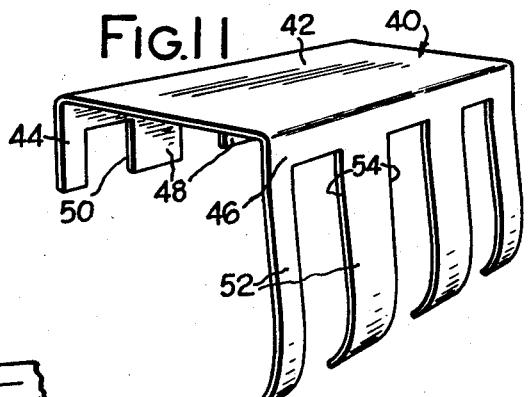
Figure 12:
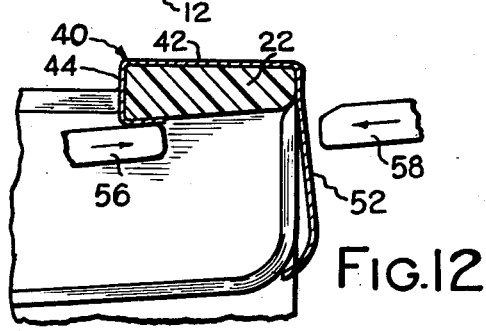

Figs. 5 and 6 are fragmentary sectional views taken on lines 5—5 and 6—6, respectively, in Fig. 13 and showing a portion of a film slide in position with respect to the confining walls of the slide tray;

Fig. 7 is a plan view of a portion of the tray showing a spring slide retaining member mounted thereon;

Fig. 8 is a front view of the tray showing the frontal edge of the spring member;

Fig. 9 is a fragmentary sectional view taken on the line 9—9 of Fig. 8 and showing one of the spring elements of the retaining member;

Fig. 10 is a fragmentary sectional view taken on the line 10—10 of Fig. 8 and showing one of the spring elements in cooperation with an edge of a film slide;

Fig. 11 is a fragmentary sectional view of the spring member before the same is mounted upon the slide tray; and Fig. 12 is a fragmentary sectional view of the spring member in position to be crimped onto a portion of the tray.

The construction of the slide tray is best seen in Figs. 1–6 and is designed for holding a plurality of film slides or transparencies, say about forty, in parallel spaced relation to each other for sequential movement into and out of projection position. The slide tray, generally indicated by the reference numeral 10, may be manufactured from any suitable material such as resin, metal, etc., and by any process. As shown in the drawing, the tray comprises a rectangular shaped plate or base 12 which has integrally formed therewith the generally U-shaped partitions or dividers 14 in spaced relation for defining compartments 16 each of which is adapted to contain a single film slide or transparency. The underside of the base 12 is provided with a rack 18 which may cooperate with a drive pinion (not shown) of a slide projector to successively advance the tray.

End walls or plates 20 are secured to and extend upwardly from the ends of the base plate 12 and across the tops of these end plates and the tops of the dividers 14 at one corner thereof, there is secured a relatively narrow top wall member or index strip 22. Numerical designations 24 are suitably embossed on the strip 22 adjacent each compartment between the dividers 14 and these numerals serve to indicate each of the transparencies in the tray for indexing purposes. A narrow strip or side wall member 26 is secured across the front side of the tray 10 and is connected to the backs of each of the dividers 14 and to the end plates 20 at the lower portion of the edges thereof. The resulting frame for the tray comprising the base or support plate 12, the dividers 14, the end walls or plates 20, and the wall members or strips 22 and 26 offer a compact and rigid structure for supporting transparencies for purposes of loading in a suitable slide projector and for permanent storage elsewhere. The front of the strip or wall member 26 includes a rack 28 which may be adapted to cooperate with a manually operable gear train (not shown) for moving the tray 10 in either direction within a tray holder.

It will also be noted that with the top strip or wall member 22 covering only a small area adjacent one corner of the tray and the front strip or wall member 26 covering approximately half of the front side of the tray adjacent the corner diagonally opposed to the strip 22, one corner of the tray for a substantial area is left free of supporting structure (see Fig. 3). The purpose for this unobstructed corner and top surface will be appreciated when considering the movement of a film slide carriage between pre-projection and projection positions. Generally, film slide carriages include a film slide engaging finger which enters the compartments of a slide tray in order to remove a film slide therefrom. The finger enters one side of the tray and must be of such a length that it will be able to move the film slides into projection position. Since the finger must clear the tray in order to permit advancing movement of the tray, the finger will necessarily be long and require an excess of space on the side of the projector from which it moves. In the present invention, a film slide engaging finger may be moved through the tray by cutting the open corner and the upper surface thereof for a substantial distance terminating adjacent the strip 22. In this manner, the length of the finger measured in the direction of its travel may be substantially reduced and the projector itself made more compact with respect to the additional space usually required for the finger.

As shown in Figs. 3, 5 and 6, the open ends of the U-shaped dividers are open to the rear of the tray 10 or to that side which faces the projection apparatus. This will enable unobstructed movement of a film slide A into and out of the tray 10. The lower ends of the compartments 16 between the dividers 14 are defined by a pair of angular fillets 30 which are adapted to contact and support the lower edges 32 of the frame of film slide A. As shown in Fig. 3, the lower edges of the compartments 16, near the entrance thereof, adjacent the open ends of the dividers 14, are flat and from this point and running along the lower ends of the compartments 16 toward the front strip 26, the fillets 30 taper upwardly reaching their greatest thickness near the front strip. The front ends of the compartments 16 adjacent the front strip 26 are provided with angular fillets 34 in the corners thereof and as will be seen in Fig. 13, the fillets 34 extend for only a short distance. The function of the fillets 30 is to direct and maintain each of the transparencies in a centered position within the compartments 16 during their movement into the tray 10 and storage therein so that the transparencies are equally spaced from one another. The fillets 34 serve to assist in positioning the transparencies in parallel relation with the dividers 14 and maintain them in this position. The fillets 30 and 34, in effect, present a means for holding the transparencies in equally spaced relationship at all times so that during continual actuation of the slide carriage, the film slide engaging finger will be able to contact each of the transparencies squarely and without any danger of slipping between a transparency and a divider and lodging therebetween.

In Figs. 7–12, there is shown a spring film slide retaining member which may be easily attached to the slide tray 10 and which serves to prevent the accidental falling out of the film slides from the tray. The spring member, indicated by the numeral 40 and shown in Fig. 11, is made of spring material and comprises a flat elongated strip 42 having a relatively short depending portion 44 and a long depending portion 46. The short depending portion 44 is formed with longitudinally and equally spaced tongues 48 with cutouts 50 spaced therebetween. Similarly, the portion 46 is formed with equally spaced spring elements 52 with cutouts 54 spaced therebetween. The cutouts 50 and 54 are of equal width, are in transverse alignment, and have a width slightly greater than the thickness of a slide divider 14. In turn, the tongues 48 and the elements 52 are of equal width, are transversely aligned, and have a width slightly shorter than the width of a compartment 16 in the tray. As shown in Fig. 11, the spring elements 52 are slightly curved in the direction of the opposite portion 44.

As shown in Figs. 7 and 8, the spring member 40 is adapted to be mounted upon the top wall member or strip 22 of the tray and, consequently, is of such a length as to extend fully between the end walls 20. The strip 42 lies flush with the top surface of the strip 22 and the depending portion 44 is bent in order to engage the inside edge of this strip, as shown in Figs. 9 and 10. In order to secure the member 40 upon the strip, a suitable crimping tool may be utilized in order to further bend the portions 44, 46 around the strip. This is shown in Fig. 12, wherein the prongs 56, 58 of a crimping tool are illustrated being driven together, as indicated by the arrows, in order to bend the portion 44 into engagement with the under surface of the strip 22 thereby securing the member 40 thereto and to bend the portion 46 around the other edge of the strip. It will be noted in the latter step, that the spring elements 52 are left free to extend away from the lower surface of the strip 22, as shown in Fig. 9, the position the elements normally occupy when there are no film slides in the tray.

When a film slide A is inserted in a compartment, the upper edge of the slide will engage the curved portion of the respective spring elements 52 and ride therealong, as shown in Fig. 10. In so moving, the element will be forced upwardly thus continuously exerting a force upon the slide A for maintaining the same within the compartment. It is preferable that the thickness of the material used to form the member 40 is such as to provide only a slight force upon film slides and thereby avoid excessive wear upon the edges of the slides.

Suitable openings 60 may be formed, by stamping, in the strip 42 in order to allow the showing of the numerals 24 imprinted upon the slide strip 22, as shown in Fig. 7.

From the foregoing description, it will be appreciated that the present invention provides a slide tray having certain novel features which permit the extension of film slide engaging fingers across the plane of the top surface thereof thereby reducing the size of the finger required to extricate a slide. In addition, means are provided for centering each of the slides within their corresponding tray compartment in order to insure their proper engagement with a film engaging finger and minimize wear and tear of the slides. A novel arrangement of a spring retaining member is utilized in order to hold the slides within the tray. With these features and arrangements, the improved slide tray of the present invention fulfills the objects previously referred to.

While there is in this application specifically described one form which the invention may assume in practice, it will be understood that this form is shown for purposes of illustration, and that the same may be modified and embodied in various other forms or employed in other uses without departing from the spirit or the scope of the appended claims.

We claim:

1. A slide tray for holding a plurality of picture slides which are to be successively advanced into projection position in a slide projector and returned to the tray after projection, said tray comprising an elongated frame of generally rectangular cross-section, one longitudinal side of said frame being in the form of a rectangular wall covering approximately all of said one side, a longitudinally extending side wall which only partially covers a second side of said frame and having one longitudinal edge contiguous with an adjacent longitudinal edge of said rectangular wall, a longitudinally extending narrow strip along the edge of a third side of the frame diagonally opposed, when said frame is viewed in cross-section, to said one edge of said second side, the fourth side of said frame being open sufficiently for permitting the ingress and egress of slides, and dividers spaced lengthwise along the interior of said frame and being mounted therein for defining compartments therebetween.

2. A slide tray as defined in claim 1 including a metallic member extending along the top of said strip and having a depending portion wrapped around one edge thereof and another depending portion bent around the other edge of the strip, said other depending portion including spaced resilient elements extending respectively within the compartments between the dividers for engaging the respective edges of film slides in the compartments to thereby releasably retain the slides therein.

3. A slide tray as defined in claim 1 including a metallic member extending along the top of said strip and having a depending portion wrapped around one edge thereof, said depending portion including a plurality of spaced tongues each of which extends into an adjacent compartment and engages the under surface of the strip whereby the member may be secured thereto, said member also including another depending portion being bent around the other edge of the strip, said other portion having a plurality of spaced resilient elements each of which extends into an adjacent compartment between the dividers for engaging an edge of a film slide in the compartment and thereby releasably retain the slide therein.

4. A slide tray for holding a plurality of picture slides which are to be successively advanced into a preprojection position of a slide projector by a tray advancing mechanism, said tray comprising an elongated frame of generally rectangular cross-section, one longitudinal side of said frame being in the form of a rectangular wall covering approximately all of said one side, a second side of said frame being in the form of a wall covering substantially one-half of said second side and having one longitudinal edge contiguous with an adjacent longitudinal edge of said rectangular wall, a longitudinally extending narrow strip along the edge of a third side of the frame diagonally opposed when said frame is viewed in cross-section to said one edge of said second side, the fourth side of said frame being open sufficiently for permitting the ingress and egress of slides, dividers spaced lengthwise along the interior of said frame and being mounted therein for defining compartments therebetween, each of said compartments being adapted to contain a slide, and means formed within each of said compartments for centering each of the slides therein and for aligning each of the slides parallel to adjacent dividers, at least one of said walls having a rack carried therewith being constructed and arranged to cooperate with the advancing mechanism.

5. An elongated tray for holding a plurality of picture slides which are to be moved seriately into projection position in a projector and returned to the tray after projection, said tray comprising a base, end walls projecting upwardly from the respective ends of the base, a plurality of partitions extending upwardly from the base and arranged in longitudinally spaced relation for holding a plurality of slides therebetween, a longitudinally extending side wall member which only partially covers one side of the tray and is located below the top edge of said side, said wall member being integrally formed with said spaced partitions and the end walls, a longitudinally extending top wall member which only partially covers the top side of the tray and is integrally formed with the end walls and the partitions adjacent the upper part of the other side of the tray, said other side of the tray being open whereby slides may be moved into and out of the spaces between the respective partitions by actuating devices which project in through the uncovered portions of said first-named side and top of the tray.

References Cited in the file of this patent
UNITED STATES PATENTS

| | | |
|---|---|---|
| 2,711,602 | Wiklind | June 28, 1955 |
| 2,756,630 | Goldberg | July 31, 1956 |

FOREIGN PATENTS

| | | |
|---|---|---|
| 319,726 | Germany | Mar. 25, 1919 |

OTHER REFERENCES

Publication Yankee Photo Products, February 15, 1957. 88–28B. Copy in Div. 7.